J. W. JACKSON.
STRAINER FOR HUMIDIFIERS.
APPLICATION FILED JAN. 3, 1916.

Patented Oct. 24, 1916.

Inventor:
John W. Jackson.
By Henry J. Miller
atty.

UNITED STATES PATENT OFFICE.

JOHN W. JACKSON, OF FALL RIVER, MASSACHUSETTS, ASSIGNOR TO AMERICAN MOISTENING COMPANY, A CORPORATION OF MAINE.

STRAINER FOR HUMIDIFIERS.

1,202,723.  Specification of Letters Patent.  Patented Oct. 24, 1916.

Application filed January 3, 1916. Serial No. 70,061.

*To all whom it may concern:*

Be it known that I, JOHN W. JACKSON, a citizen of the United States, residing at Fall River, in the county of Bristol and State of Massachusetts, have invented new and useful Improvements in Strainers for Humidifiers, of which the following is a specification, reference being had to the accompanying drawings, forming part thereof.

This invention relates to improvements in strainers for humidifying machines in which it is desirable to collect surplus water passing from the humidifier device and to direct said water into a return pipe for re-use.

One object of this invention is to provide a strainer device for the collected water rising in the receiving pan that a progressively increasing area of straining means is present to facilitate the operation of straining the water before it can reach the return pipe and whereby, when a small area of the strainer becomes clogged, the rising collected water may have passage through said increased area.

Another object of the invention is to provide a duplex strainer of a construction to require but little attention at long intervals which can be readily cleaned and which, if so neglected that it becomes wholly clogged as to its straining function, has an open passage to the return or outlet pipe.

Other objects of the invention will appear from the following description.

The invention consists in the improved strainer.

The invention also consists in the improved strainer and in the means for collecting water which ultimately may pass through the strainer.

The invention still further consists in such other novel features of construction and combination of parts as shall hereinafter be more fully described and pointed out in the claim.

Figure 1:
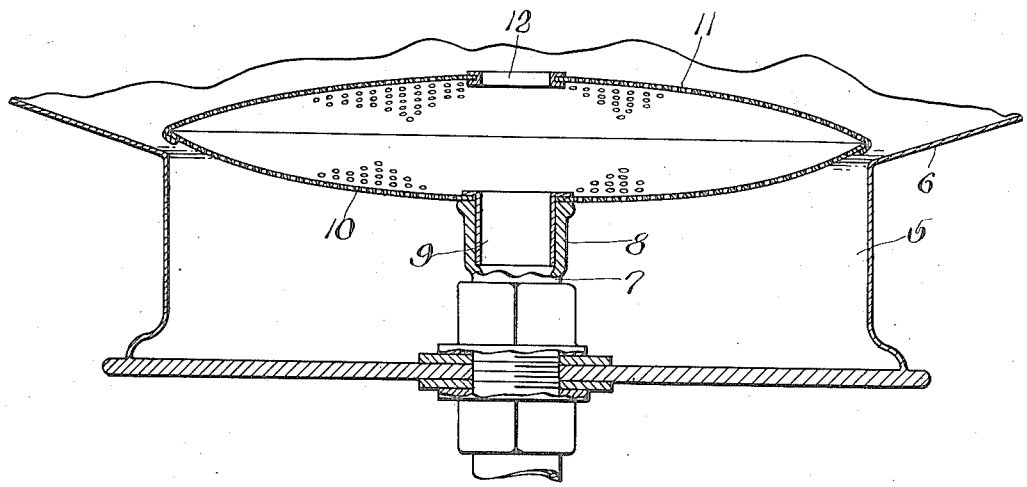
Figure 2:
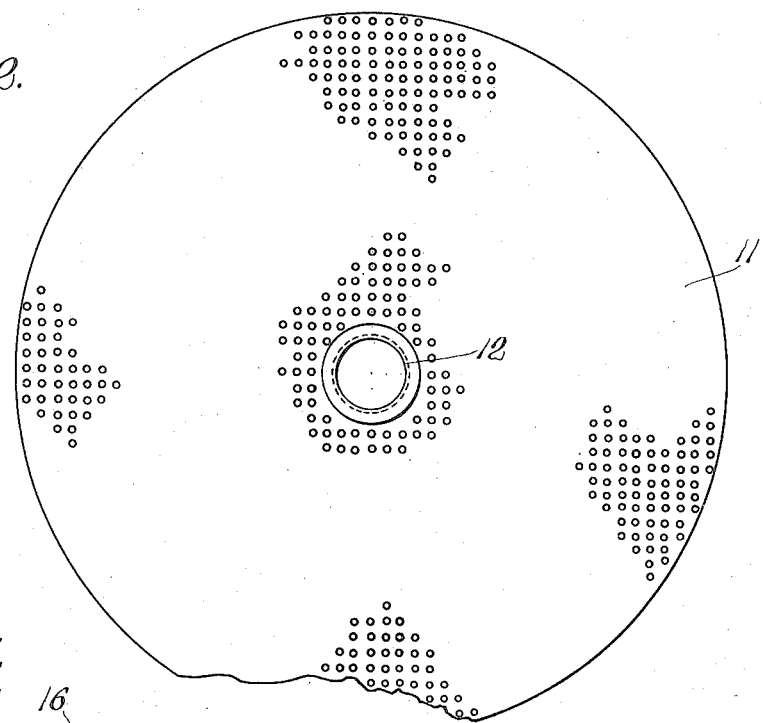
Figure 3:
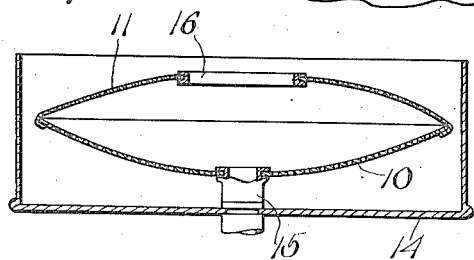

Figure 1, represents a vertical sectional view of portions of a humidifier casing and of the improved strainer mounted in said casing relative to the water receptacle thereof and to the outlet pipe. Fig. 2, represents a plan view of the improved strainer. Fig. 3, represents a view reduced in size of the strainer and a water receptacle illustrating a modification of the invention in which the overflow opening in the upper screen member is larger than the outlet or waste pipe whereby, if desired in certain uses the interior of the screen may be flushed to force outward clogging matter gathered on the exterior of the screen or strainer.

As shown in the drawings 5 designates the water receptacle of a humidifier having the drip receiving pan or wall 6 which latter is adapted to receive waste or surplus moisture and direct the same to the receptacle 5.

Mounted axially of the bottom of receptacle 5 is the outlet pipe 7 having at its upper end the socket 8 to removably receive the tubular extension 9 of the strainer which latter comprises the dished or convex strainer members 10 and 11 connected at their peripheries and spaced apart at their axes. These strainer members 10 and 11 are preferably constructed of sheet metal and have a multiplicity of perforations of suitable size. The member 10 has a central opening to receive the tubular extension 9 and the member 11 has a central opening which has the collar 12.

In practice the strainer and its tubular extension or stem 9 are preferably so proportioned to the depth of the water receptacle 5 that, when mounted as shown in Fig. 1 of the drawings, the peripheral edge of the strainer is above and spaced from the shoulder constituted by the juncture between the drip pan 6 and the water receptacle 5 so that water may flow freely from the drip pan into said receptacle 5. The purpose of making the strainer members 10 and 11 convex as to their outer surfaces is to afford a constantly varying area of strainer to the water rising in the receptacle 5. Under certain conditions the water rising in receptacle 5 will pass through the perforations of the upwardly extending wall of member 10 near the center of said member and will find its outlet through extension 9 and pipe 7. If and as the perforations near the center of said member 10 become clogged the water will rise in the receptacle 5 until it reaches other and a gradually increasing number of said perforations through which the water will pass to the inner surface of member 5 and will run down said surface toward the outlet with a tendency to act on the material which clogs the more centrally located perforations and loosen such material. If the perforations in strainer member 10 become ultimately so clogged that the water rises above member 11 such water may find its way through the perforations of such member 11 and finally, if the entire strainer becomes unduly clogged, the waste water may pass through the safety outlet constituted by the central opening in strainer member 11.

In the modified construction shown in Fig. 3 I have shown the improved strainer as applied to any suitable receptacle 14 for water or other liquid and having the outlet 15. In this construction the strainer members 10 and 11 are similar to those shown in Figs. 1 and 2 with the exception that the central opening in member 11, identified by collar 16 is considerably larger than the outlet 15 whereby on occasion water may be introduced through said central opening in sufficient quantity to effect the flushing of the interior of said strainer members. This strainer may be raised to disengage its tubular extension 9 from the socket 8 and the foreign matter accumulated on the strainer members may then be wiped off.

It is of course obvious that the strainer members 10 and 11 instead of being made of perforated sheet metal may be made of any suitable foraminous material. It is also obvious that the construction of the members 10 and 11, and the manner in which they are secured together may be varied from that shown and that, in some cases, the member 11 may be dispensed with or its central opening may be enlarged to any extent within the limits of the periphery of the strainer.

Having thus described my invention I claim as new and desire to secure by Letters Patent—

A strainer of the nature described comprising in combination with a water receptacle having a drip pan delivering to said receptacle and an outlet pipe positioned centrally of said receptacle, of a strainer comprising a pair of oppositely convexed strainer members connected at their peripheries, the lower of said members having a central opening furnished with means to engage said outlet pipe and the upper of said members having a central overflow inlet opening adapted to deliver directly to said outlet.

JOHN W. JACKSON.